United States Patent
Rahmat et al.

(10) Patent No.: US 11,552,933 B2
(45) Date of Patent: Jan. 10, 2023

(54) PRIVACY PRESERVING UNI-DIRECTIONAL COMMUNICATION DEVICE

(71) Applicant: Siemens Mobility GmbH, Munich (DE)

(72) Inventors: Safia Rahmat, Plainsboro, NJ (US); Leandro Pfleger de Aguiar, Robbinsville, NJ (US); Omer Metel, Anchorage, KY (US)

(73) Assignee: Siemens Mobility GmbH, Munich (DE)

( * ) Notice: Subject to any disclaimer, the term of this patent is extended or adjusted under 35 U.S.C. 154(b) by 292 days.

(21) Appl. No.: 16/894,163

(22) Filed: Jun. 5, 2020

(65) Prior Publication Data

US 2021/0385196 A1    Dec. 9, 2021

(51) Int. Cl.
*H04L 9/40* (2022.01)
*G06N 3/08* (2006.01)

(52) U.S. Cl.
CPC ........... *H04L 63/0421* (2013.01); *G06N 3/08* (2013.01)

(58) Field of Classification Search
CPC .......... G06N 3/08; G06N 20/00; H04L 63/04; H04L 63/0421; H04W 12/00
See application file for complete search history.

(56) References Cited

U.S. PATENT DOCUMENTS

| | | |
|---|---|---|
| 2006/0070117 A1 | 3/2006 | Spalink et al. |
| 2019/0087835 A1 | 3/2019 | Schwed et al. |
| 2019/0340541 A1 * | 11/2019 | Watson ................ G06N 3/0454 |
| 2020/0082290 A1 | 3/2020 | Pascale et al. |
| 2022/0076066 A1 * | 3/2022 | Forgeat ................ G06K 9/6263 |

FOREIGN PATENT DOCUMENTS

WO    20200061388 A1    3/2020

OTHER PUBLICATIONS

International Search Report corresponding to application No. PCT/US2021/027455; Filing Date: Apr. 15, 2021; 11 pages.
Cynthia Dwork; Aaron Roth; "The Algorithmic Foundations of Differential Privacy"; Foundations and Trends in Theoretical Computer Science vol. 9, Nos. 3-4 (2014) 211-407; 2014; DOI: 10.1561/0400000042.

* cited by examiner

*Primary Examiner* — Olugbenga O Idowu

(57) ABSTRACT

In an industrial system, a data capture apparatus can be configured to operate as a unidirectional communication connection between a private network and a public network. The data capture apparatus can be further configured to collect raw data from the private network. The raw data can define a data distribution. The data capture apparatus can be further configured, based on the data distribution of the raw data, to generate anonymized or synthetic data that represents the raw data. The anonymized data can be transmitted over the unidirectional communication connection to a receiver machine of the data capture apparatus. In some cases, the receiver machine can send the anonymized data to an analysis system within the public network, such that the raw data can be analyzed by the analysis system, based on the anonymized data that represents the raw data, without the analysis system obtaining the raw data.

17 Claims, 5 Drawing Sheets

PRIVACY PRESERVING UNI-DIRECTIONAL COMMUNICATION DEVICE

BACKGROUND

Cyber-attacks on private computer networks have long been at the forefront of detection and protection efforts using information technology. It is recognized herein, however, that the threat of cyber attacker intrusion to industrial systems, such as automation and control systems that support critical infrastructure, is gaining attention. Due to aspects such as, for example, vertical integration of the production systems and horizontal integration of the value chain, industrial control system (ICS) networks are often directly or indirectly connected to IT networks (office network) and the Internet, thereby offering an opportunity for cyber attackers to penetrate such environments and exploit any existing vulnerabilities. It is further recognized herein that OT (Operations Technology) systems such as, for example, programmable logic controllers (PLCs), Distributed Control Systems (DCS), motion controllers, Supervisory Control and Data Acquisition (SCADA) servers, and Human Machine Interfaces (HMIs), offer many additional challenges when it comes to deploying security measures.

In particular, IT networks are often connected to OT systems so as to collect data from the OT systems. It is recognized herein, however, that current approaches to collecting the data from OT systems might compromise privacy associated with the data, which can result in valuable trade secrets, logic, or data, among other information, being divulged to competitors or others. For example, secrets can be derived from network traffic that is used for network monitoring, such as process recipes or other ICS data. It is further recognized herein that current approaches often require that security monitoring operations are hosted on the cloud or off-premises, which can add to the risk of a data compromise.

BRIEF SUMMARY

Embodiments of the invention address and overcome one or more of the described-herein shortcomings by providing methods, systems, and apparatuses that protect the privacy of data. By protecting the privacy of raw data, for instance by generating anonymized or synthetic data that represents the raw data, the raw data can used or analyzed via the anonymized or synthetic data. For example, a data capture apparatus can be configured to operate as a unidirectional communication connection between a private network and a public network. The data capture apparatus can be further configured to generate anonymized or synthetic data from real data that is collected from a private network. The anonymized or synthetic data can represent the real data, such that the real data can be analyzed outside of the data capture apparatus without the data capture apparatus disclosing the actual real data.

In an example aspect, a data capture apparatus is configured to operate as a unidirectional communication connection between a private network and a public network. The data capture apparatus can include a sender machine comprising a unidirectional network interface coupled to one or more devices of the private network. The sender machine can be configured to collect raw data from the one or more devices of the private network. The raw data can define a first data distribution. The data capture apparatus can further include a receiver machine configured to receive synthetic data from the sender machine via the unidirectional communication connection. The sender machine can be further configured to generate the synthetic data based on the first data distribution of the raw data, such that the synthetic data represents the raw data without disclosing the raw data. Thus, the sender machine can connect to the source data and forward anonymized or synthetic data that is based on the source data, to the receiver machine, which can be physically separate from the sender machine so as to not have access to the source data.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
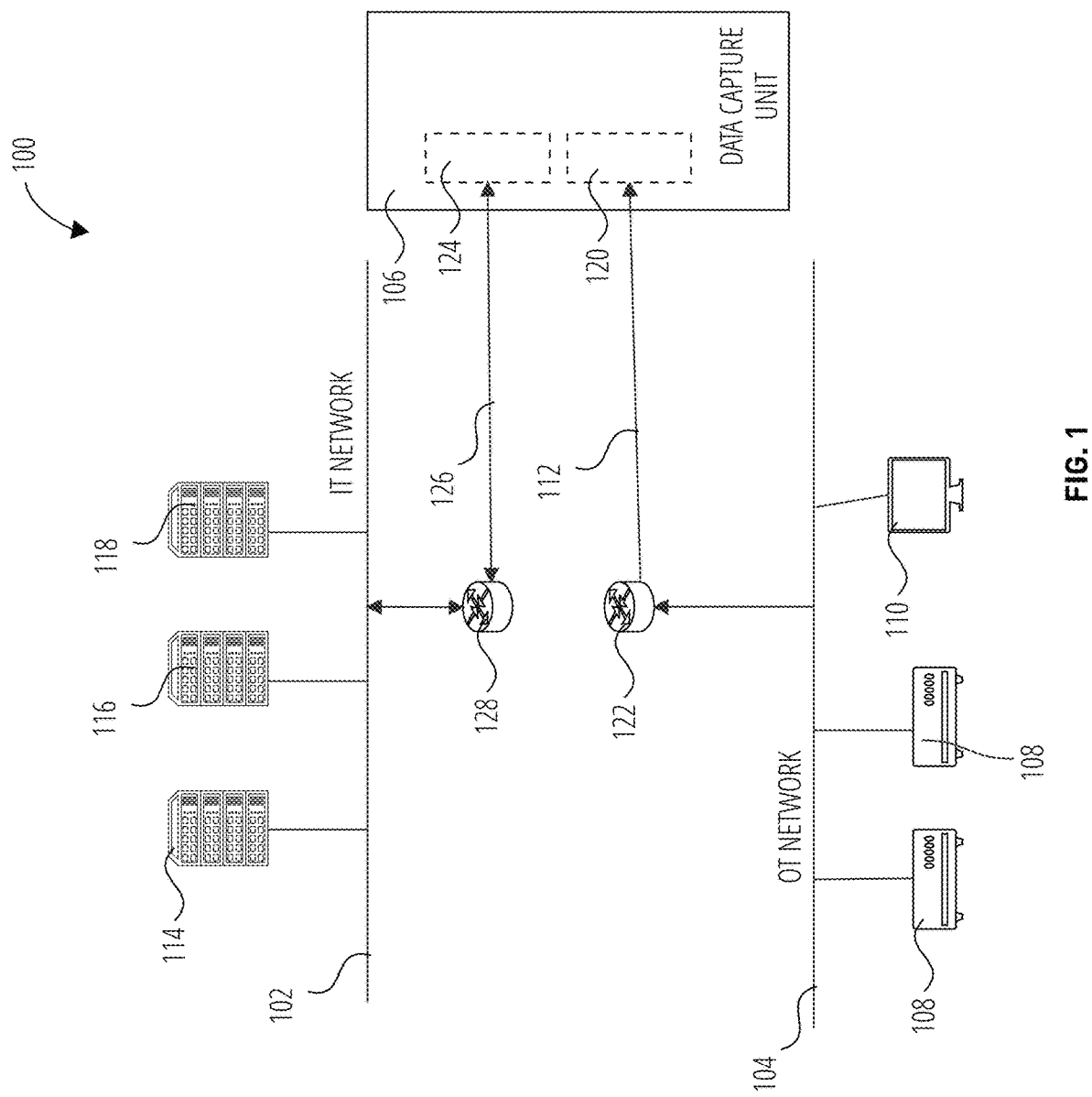
FIG. 1 is a block diagram of a data capture unit (DCU) apparatus deployed within an example industrial control system (ICS).

Referring initially to FIG. 1, an example distributed control system (DCS) or industrial control system (ICS) 100 includes an untrusted or unsecure IT network 102, such as an office or corporate network, and a secure or trusted operation technology (OT) network 104, such as a production network, communicatively coupled to the IT network 102 via a data control apparatus or data control unit (DCU) 106. The IT network 102 can define an office or public network that has lower security requirements than the OT network 104, which can define a private or critical production network. The DCU 106 can be configured to operate as a unidirectional communication connection between a private network and a public network. The DCU 106 can collect network traffic data that is shared over the OT network 104, via a communication link 112 from the OT network 104 to the DCU 106. In particular, for example, the OT network 104 can include various production machines configured to work together to perform one or more manufacturing operations. Example production machines of the production network 104 can include, without limitation, robots and other field devices, such as sensors, actuators, or other machines, which can be controlled by a respective programmable logic controller (PLC) 108. The PLC 108 can send instructions to respective field devices. In some cases, a given PLC 108 can be coupled, or the OT network 104 can otherwise include, human machine interfaces (HMIs) 110. It will be understood that the ICS 100 is simplified for purposes of example. That is, the ICS 100 may include additional or alternative nodes or systems, for instance other network devices, that define alternative configurations, and all such configurations are contemplated as being within the scope of this disclosure.

For example, the ICS 100 can be configured for building automation, energy automation, traffic management systems, train automation, embedded medical devices, or the like.

In some cases, the communication link 112 is configured to receive data from the OT network 104, but not send data to the production network 104, such that that communication link 112 defines a unidirectional communication link from the OT network 104 to the DCU 106. Thus, the DCU 106 can define a unidirectional communication connection between the IT network 102 and the OT network 104, for instance from the OT network 104 to the IT network 102 or, in alternative cases, from the IT network 102 to the OT network 104. Network packets that are collected by the DCU 106 can be used by cybersecurity functions that are performed on the IT network 102. The collected network packets can be sent from the DCU 106 to the IT network 102, in particular to systems within the IT network 102 such as, for example and without limitation, an Intrusion Detection System (IDS) 114, a Security Information and Event Management (SIEM) system 116, and a Forensic Analysis system 118. The IT network 104 can also define or include the cloud. For example, managed security service providers (MSSPs) can host the monitoring data (e.g., IDS 114, SIEM System 116, Forensic Analysis system 118) off-premises or on the cloud. It is recognized herein that such fine-grained data extraction from critical production systems, for instance production systems within the OT network 104, can create privacy issues. For example, the OT network 104 may include different asset owners that each control respective data, and a breach of data privacy can result in confidential information being divulged to different asset owners. Such data or privacy breaches can also result in different asset owners refraining from sharing their data with a central entity, such as the IDS 114, the SIEM system 116, or the Forensic Analysis system 118, which can lower overall security in terms of anomaly detection capabilities, among other negative effects. Thus, embodiments described herein address privacy issues related to data that is collected from the OT network 104, while maintaining the utility of the collected data.

With continuing reference to FIG. 1, the DCU 106 can include Ethernet ports 120 that are connected to the OT network 104, for instance via a switch 122. The Ethernet ports 120 can define a unidirectional interface that is configured to receive real or raw data packets without being able to send packets out. The DCU 106 can further include a multi-directional interface or port 124 that can communicate with the IT network 102, for instance via a switch 128. In particular, the multi-directional interface 124 can send data to, and receive data from, the IDS 114, the SIEM system 116, and the Forensic Analysis system 118. In some cases, for example, the multi-directional port 124 is exposed to the IT network 102 such that the IDS 114, the SIEM system 116, and the Forensic Analysis system 118 can access data packets collected by the DCU 106, so as to record packets and/or perform data packet analysis on the recorded packets. Thus, it is recognized herein that the of the packets at rest and in motion can be critical for various functions related to the DCU 106. Further, it will be understood that security monitoring is provided as an example use case for the data provided by the DCU 106, and the data is not limited to security uses. By way of example, data can be provided by the DCU 106 for condition-based monitoring. In such an example, process variable content (e.g., time series data of a sensor) can be anonymized and shipped for anomaly detection on the cloud.

By way of example, if the collected data is not protected, a hacker might sniff and/or manipulate (e.g., change, delete, create) the collected data on the DCU 106. For example, a hacker might access the DCU 106 over the IT network 102 via the multi-directional port 124, so as to sniff the data on the DCU 106. In some cases, the multi-directional port 124 is used to send collected data packets to the IT network 102 over a TCP stream that might not be secure against cyber attacks. Thus, a hacker might use a computing device that connects to the IT network 102 to directly or indirectly access the DCU 106, so as to sniff the collected data within the DCU 106. By way of another example, a hacker might use sniffed data to their competitive advantage, for example by identifying confidential logic or attributes associated with the data, in addition to the data itself.

In an example embodiment, to protect against such sniffing, among other potential vulnerabilities, the DCU 106 generates anonymized data that can be analyzed by systems within the IT network 102 or elsewhere, for instance the SIEM system 116. In some cases, the anonymized data defines synthetic data that is generated based on real data, such that the synthetic data defines one or more statistical properties that are similar or the same as the real data. The anonymized or synthetic data can be generated so as to preserve the privacy of the original dataset, while maintaining the utility of the original dataset. It is recognized herein that other approaches to protecting privacy, such as encoding, differential privacy, or the like, can be ill-suited for an industrial environment that includes heterogeneous OT networks with different and/or legacy applications across the network. By way of example, other privacy techniques might require implementations at the source of data generation (e.g., heterogeneous OT networks), which can make standardization across networks difficult or cost-prohibitive.

Figure 2:
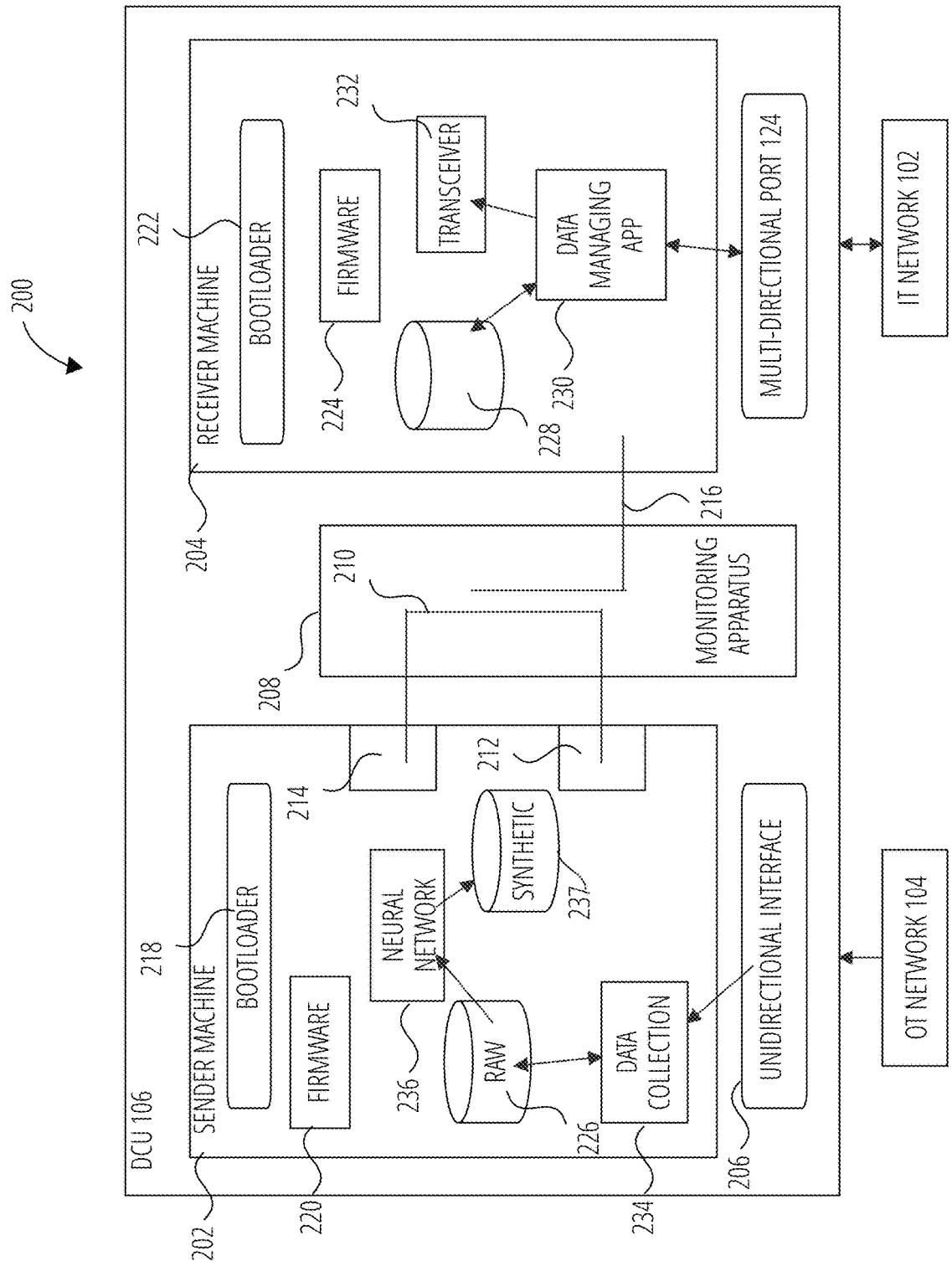
FIG. 2 is another block diagram of the DCU according to an example embodiment.

Referring to FIG. 2, an example ICS 200 can include the DCU 106. In accordance with an example embodiment, the DCU 106 can include a first or sender machine 202 and a second or receiver machine 204 configured to receive data from the sender machine 202. The DCU 106 can further include a unidirectional network interface 206 coupled to the sender machine 202 and the private OT network 104, such that the sender machine 202 can receive data from the private OT network 104 via the unidirectional network interface 206. In an example, the unidirectional network interface 206 includes the Ethernet ports 120. In some cases, the sender machine 202 can include the unidirectional network interface 206 that can be coupled to one or more devices of a private network, for instance the OT network 104. Thus, in some examples, the sender machine 202 can be configured to collect real or raw data from the one or more devices of the private OT network 104, and the raw data can define a data distribution, for instance a first data distribution. By way of example, and without limitation, the raw data can indicate various process variables related to the OT network 104, such as temperature, pressure, motor speed, heater variables, pump variables, valve variables, or the like. By way of further example, the raw data can include network traffic metadata, endpoint/host data (e.g., performance counters), control system specific data (e.g., PLC memory content of critical memory areas monitored for malicious manipulation), personal health data (e.g., lab test data), building data (e.g., temperature, pressure, air flow, speed, humidity), or energy parameters (e.g., frequency, voltage, power consumption, load, current).

As further described herein, the sender machine 202 can be configured to generate anonymized or synthetic data based on the data distribution of the raw data, such that the anonymized or synthetic data represents the raw data without disclosing the raw data. The receiver machine 204 can be configured to receive the anonymized or synthetic data from the sender machine 202. In some cases, the sender machine 202 is further configured to generate the anonymized data that corresponds to the raw data as the sender machine 202 receives the respective raw data, so as to define continuous online data anonymization.

The multi-directional port 124 of the DCU 106 can be coupled to the receiver machine 204 and IT network 102, such that the receiver machine 204 can send data to, or receive data from, the IT network 102. In particular, the receiver machine 204 can be configured to send the synthetic data to an analysis system within the public IT network 102, such that the raw data can be analyzed based on the synthetic data that represents the raw data. In some examples, the unidirectional network interface 206 only allows data to be received from, and not sent to, the OT network 104, such that only unidirectional communications are allowed from the OT network 104 to the public IT network 102. The OT or production network 104 may define a critical or private network such as, for example, a network for industrial automation, a financial network, a network for railway automation and control, a life-critical system, or the like. In some cases, the OT network 104 obtains monitoring and evaluation services from a service provider located in the IT network 102, which can define an insecure public network, such as an internet-based or cloud-based service capable of providing intensive data analysis related to security or diagnostics. The DCU 106 can listen on the unidirectional network interface 206, in particular the Ethernet ports 120, in a passive manner, for instance by performing sniffing operations, such that active requests are not sent to devices within the OT network 104.

As described herein, the DCU 106 can define a unidirectional communication device that supports one or more privacy preserving mechanisms. Such privacy preserving techniques can be activated for one or more data streams from one or more sources, so as to ensure that data that is output from the receiver machine 204 is safe for transit in a network environment (e.g., IT network 102) that is less secure than the network environment from which the original data is collected (e.g., OT network 104).

The DCU 106 can further include a monitoring apparatus 208 configured to transfer data, for instance the synthetic data, from the sender machine 202 to the receiver machine 204 without permitting data to be transferred from the receiver machine 204 to the sender machine 202. In some examples, the monitoring apparatus 208 can define a data copier or network tap, so as to provide unidirectional data transmission from the sender machine 202 to the receiver machine 204 without the sender machine 202 and receiver machine 204 being hardwired together. In an example, the monitoring apparatus 208 can include a wire 210 arranged in a loop, such that the wire 210 is connected to an output 212 defined by the sender machine 202, and to an input 214 defined by the sender machine 202. Thus, data can be transmitted by the sender machine 202 at the output 212, along the wire 210, and back to the sender machine 202 at the input. The input 214 and the output 212 of the sender machine 202 can be isolated from the unidirectional network interface 206. In an example, the monitoring apparatus 208, in particular the wire 210, can define an inductor so as to transfer data from the sender machine 202 to the receiver machine 204 without a conductive wire or cable connected between the sender machine 202 and the receiver machine 204. For example, the monitoring apparatus 208 can further include an interceptor 216 that is connected to the receiver machine 204. In some examples, the interceptor 216 can define a conductive wire such that the conductive wire and the wire 210 that defines the loop can be inductively coupled with one another.

Thus, in an example, a data stream can pass through the loop from the output 212 through the wire 210 to the input 214. Such a data stream can be duplicated inductively by the interceptor 216, and passed to the receiver machine 204 via the connection between the interceptor 216, for instance the conductive wire, and the receiver machine 204. The original data stream that passes through the loop can remain unchanged from the output 212 to the input 214. Thus, the monitoring apparatus 208 can define an inductive configuration that connects the sender machine 202 to the receiver machine 204, and thus connects the OT network 104 to the IT network 102. In particular, the monitoring apparatus 208 can define a physically separated connection between the OT network 104 and the IT network 102. In some cases, only duplicated data from the wire 210 that defines the loop can be transferred unidirectionally to the receiver machine 204 due to the inductive configuration of the monitoring apparatus 208. That is, in various examples, data cannot flow from the interceptor 216 to the wire 210 that defines the loop, thereby providing the OT network 104 with freedom from interference with respect to the IT network 102. In an example, the interceptor 216 functions as a network test access point (TAP) that intercepts the transmission between the output 212 and the input 214 defined by the sender machine 202, and copies that data to a monitor port the receiver machine 204. In another example, the interceptor 216 can be implemented as a switched port analyzer (SPAN) that performs port mirroring of the intercepted transmissions on the wire 210 that defines the loop. In yet another example, data can be sent to directly to the DCU 106, in particular the sender machine 202, for anonymization. In some examples, the data can be anonymized, and the anonymized data can be made available on the receiver machine 204 upon request.

Still referring to FIG. 2, the sender machine 202 can further include a bootloader 218 and firmware 220 that can include operational instructions for the sender machine 202, and thus for the DCU 106. Similarly, the receiver machine 204 can further include a bootloader 222 and firmware 224 that can include operational instructions for the receiver machine 204, and thus the DCU 106. The DCU 106 can also include one or more databases. For example, the sender machine 202 can include a first sender or raw data database 226 and a second sender or sanitized synthetic data database 227 data database 227. The receiver machine 204 can include a receiver database 228. In an example, data that is copied from the sender machine 202 can be buffered in the receiver database 228. Similarly, data that is received by the sender machine 202 from the OT network 104 can be buffered in the raw data database 226, for example, so that the data can be processed so as to be privacy-protected. As described herein, data from the raw data database 226 can be processed so as to define sanitized data. Sanitized data can be buffered in the synthetic data database 227 before being transmitted via the wire 210 of the monitoring apparatus 208 at regular intervals, predefined times, or the like.

In various examples, the DCU 106 can include one or more processors that may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of hardware and firmware. In an example aspect, any software and firmware deployed in the receiver machine 204 can executed by a processor of the receiver machine 204. In an aspect, any software and firmware deployed in the sender machine 202 can be executed by a processor of the sender machine 202, so as to maintain physical isolation between the pubic IT network 102 and the private OT network 104, and to ensure unidirectional communication. Processors of the DCU 106 may also comprise memory storing machine-readable instructions executable for performing tasks. Processors of the DCU 106 may use or comprise the capabilities of a computer, controller or microprocessor, for example, and be conditioned using executable instructions to perform special purpose functions not performed by a general purpose computer. The DCU 106 may include one or more processors that include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, processors of the DCU 106 may have any suitable microarchitecture design that includes any number of constituent components such as, for example, registers, multiplexers, arithmetic logic units, cache controllers for controlling read/write operations to cache memory, branch predictors, or the like. The microarchitecture design of the processors may be capable of supporting any of a variety of instruction sets.

With continuing reference to FIG. 2, the receiver machine 204 may include various applications or modules, such as embedded cyber security applications for supporting security monitoring and diagnosis related to the OT network 104. For example, the sender machine 202 can include a transceiver module 232 configured to send and receive data to devices in various networks such as, for example, GPRS, LTE, or 5G networks. Additionally, or alternatively, the receiver machine 204 can include a data managing application 230 that can be configured with a given data processing policy, and can process data in accordance with the data processing policy. In an example, the data managing application 230 can read and/or delete data from the receiver database 228. In some cases, the data managing application 230 can filter and/or compress data in accordance with a policy. Further, the data managing application 230 can transmit copied data from the sender machine 202 to the IT network 102, in particular, for example, to the IDS 114, the SIEM system 116, or the Forensic Analysis system 118. The duplicated data can be transmitted via the transceiver module 232 or multi-directional port 124. In some cases, data that is received in the receiver machine 204 can be transmitted to systems within the IT network 102 by way of a push mechanism, for instance by passing data as in a publish-and-subscribe approach. Additionally, or alternatively, data can be buffered in the receiver database 228 and can be transmitted by way of a pull mechanism by systems within the IT network 102. For example, systems can actively request data from the receiver database 228 or the receiver machine 204, for instance via the multi-directional port 124.

The sender machine 202 can also include various applications or modules in accordance with various embodiments. In some examples, the sender machine 202 can include a data collection application 234 configured to receive data from data capture ports, for instance Ethernet ports 120, of the unidirectional network interface 206. In some cases, the data collection application 234 can be configured to filter data in accordance with a policy. Such a policy or configuration can be obtained, in some examples, by the data collection application 234 from the sender database 226. The sender machine 202 can further include various privacy preserving applications. In particular, for example, the sender machine 202 can be configured to include a neural network application or module 236 that is configured to protect the privacy of information related to data that is collected from the OT network 104, and stored in the raw data database 226, as further described herein.

In some examples, the neural network module 236 includes or accesses a generative adversarial network (GAN) that can learn attributes related to raw data collected from the OT network 104, so as to generate sanitized data. For example, the data collection application 234 can collect raw data from the unidirectional network interface 206 and provide the raw data to the neural network module 236. The neural network module 236 can learn the distribution of the collected raw data. Based on learning the data distributions associated with raw data, the neural network module 236 can generate a data sample that has a similar distribution to given raw data. Such a data sample can define sanitized data that corresponds to raw data. By way of example, the sanitized data can be sent to the receiver machine 204 from the sender machine 202, and the receiver machine 204 can transmit the sanitized data to the IT network 102, for instance to the SIEM system 116 for analysis. Thus, in such a configuration, the data that leaves the DCU 106 is different than the actual data that is collected from the OT network 104. It is recognized herein that, because the actual raw data is not transmitted to the receiver machine 204 or outside the DCU 106, privacy protections are enhanced, such that various data owners or customers associated with OT networks may have greater confidence in sharing their data for combined analysis at various systems, for instance the SIEM system 116. Further, more data that is shared and analyzed, for instance at the SIEM system 116, can enhance anomaly detection capabilities, among other capabilities that are based on analyzing data.

Figure 3:
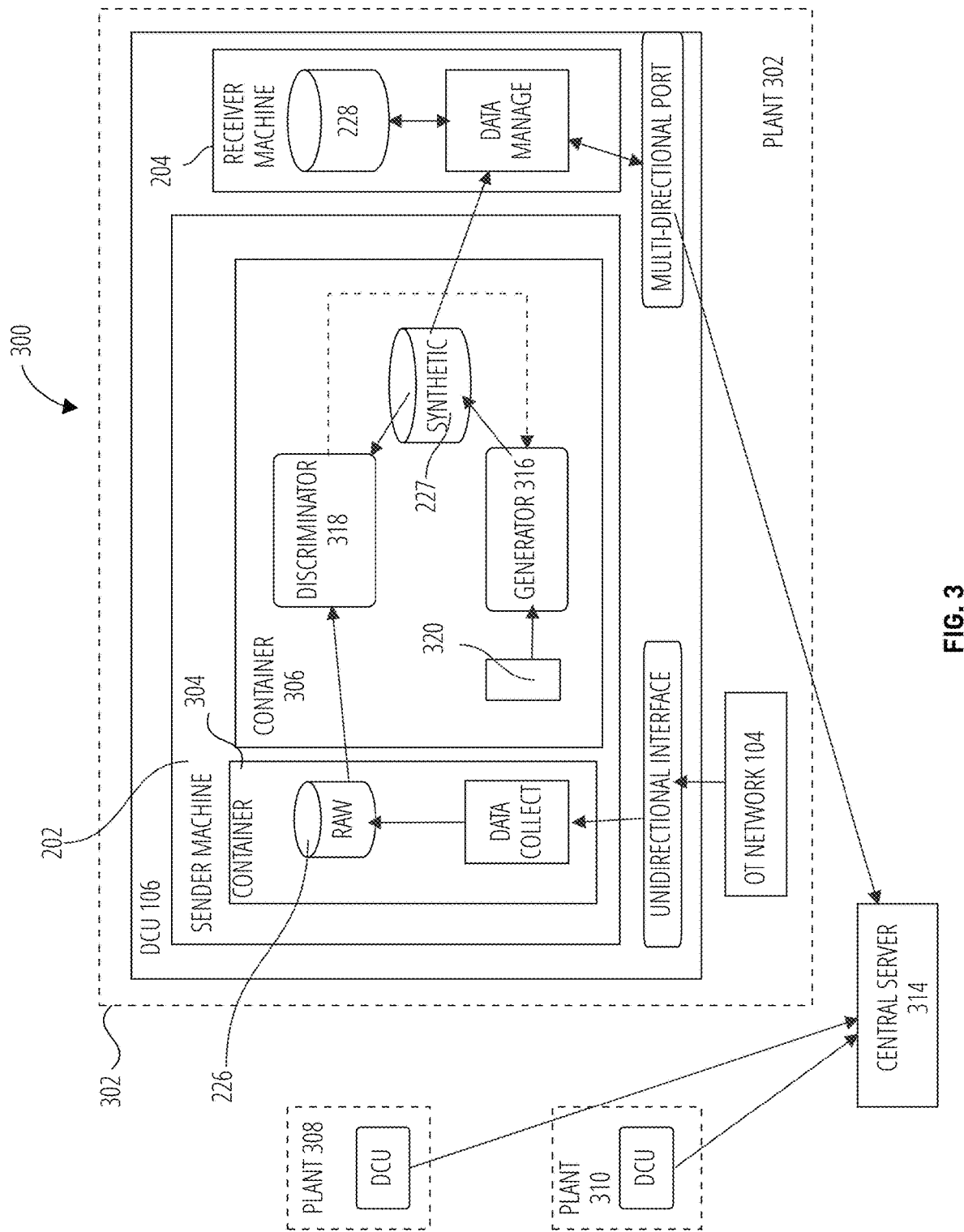
FIG. 3 illustrates an example system that includes a plurality of DCU apparatuses coupled to a central server for analysis, in accordance with an example embodiment.

Referring now to FIG. 3, an example system 300 includes the DCU 106 deployed at a plant, for instance a first plant 302. The plant 302 can further include the OT network 104. The DCU 106, in particular the sender machine 202, can include one or more containers that define respective runtime environments for applications or modules. For example, the sender machine 202 can include a first container 304 and a second container 306 that is separate from the first container 304. The containers can be protected such that the first and second containers 304 and 306 cannot be configured by various users of the DCU 106. The first container 304 can include the data collection application 234 and the raw data database 226. The second container 306 can include one or more data privacy-preserving applications or modules. In an example embodiment, the second container 306 includes the neural network module 236 that is configured to generate synthetic data based on raw data. In particular, the raw data collected by the data collection application 234 can define a first data distribution, and the neural network module 236 can generate synthetic data based on the first distribution of the raw data, such that the synthetic data defines a second data distribution that falls within a predetermined tolerance of the first data distribution. By way of example, the data distributions of the synthetic and real data can each define a mean, and the means can be compared to a predetermined tolerance to determine whether they are sufficiently close to each other such that the synthetic data sufficiently represents the raw data. The predetermined tolerance can vary as desired. For example, the predetermined tolerance might vary depending on the type of data that is being generated and compared. By way of another example, the predetermined tolerance may also indicate a maximum accuracy with which the synthetic data can represent the raw data. For example, in some cases, if the synthetic data is too close (e.g., greater than an upper limit of the predetermined tolerance) to the raw data, privacy related to the raw data might be comprised. Thereafter, the synthetic data that represents the raw data can be analyzed, such that an analysis of the raw data is performed without the raw data having to be sent to the receiver machine 204, and thus without the raw data having to be sent to any analysis systems.

In some cases, one or more statistical properties of the raw data are identified and compared to one or more statistical properties of the corresponding synthetic data. Statistical properties may include, for example and without limitation, average, mean mode, standard deviation, overall data distribution (e.g., defined by linear or nonlinear regression), kurtosis, and skewness. Data can be anonymized or synthesized by the sender machine 202 so as to preserve one or more statistical properties of interest. Thus, the sender machine 202 can be configured to preserve one or more select statistical properties, which can be dependent on the type of raw data that is collected. Further, in some cases, the statistical properties that are of interest can be changed while data is collected.

The data collection application 234 within the first container 304 can be configured to listen to the unidirectional network interface 206 so as to collect the raw data from one or more devices of the private OT network 104. In an example configuration, the data collection application 234 is within a separate container from the neural network module 236, or is otherwise separated from the neural network module 236, such that the data collection application 234 can be updated or scaled without interrupting the neural network module 236.

Further, still referring to FIG. 3, the system 300 can include a plurality of sites or plants that each provide data to a central system or server 314, for example, so that data can be pooled and analyzed collectively. The plurality of sites or plants can each include one or more DCUs 106 that can provide synthetic data to the central server 314. Thus, a plurality of DCUs can be configured to operate as a unidirectional communication connection between the central server 314 and a respective private network of a plurality of private networks of the system 300. In an example, synthetic data can be retrieved by the SIEM system 116 and/or the IDS 114 from the central server 314 for analysis. The example system 300 includes a first plant 302, a second plant 308, and a third plant 310, though it will be understood that any number of sites or plants, and thus any number of DCUs, can be coupled to the central server 314 as desired. The receiver machine 204 of each of the DCUs 106 in the system 300 can be configured to send respective synthetic data to the central server 314, such that the raw data from the plurality of the private OT networks can be analyzed, based on the synthetic data that represents the raw data, without the central server obtaining the raw data.

It is recognized herein that generating synthetic data and providing the synthetic data, rather than the raw or real data, to a central server of analysis system can protect various information related to the raw data, in addition to the raw data itself. In some cases, the synthetic data can be generated so as to mask values associated with the corresponding raw data. By way of further example, and without limitation, the identity of various asset owners related to each of the plants, logic or trade secrets related to the plants, and components or systems of the various plants, can be protected by generating synthetic data to represent raw data. It is further recognized herein that such privacy protections derived from the synthetic data can, in some cases, motivate or allow the various plants to combine their data together at the central server 314 for analysis, thereby improving the data sample that can be analyzed and enhancing the data analysis that can be performed.

With continuing reference to FIG. 3, the neural network module 236 can include a generator 316 and a discriminator 318 so as to define a generative adversarial network (GAN) or convolutional neural network (CNN). The sender machine 202 can be configured to train the neural network based on real or raw data from one or more devices of the private OT network 104. When the neural network is trained, the neural network module 236 can generate synthetic data, based on corresponding raw data, that defines a data distribution that is similar to the data distribution of the corresponding raw data. For example, the synthetic data can define a data distribution that falls within a predetermined tolerance of the data distribution defined by the corresponding raw data. In some cases, noise vectors 320 are input into the generator 316. In an example, the noise vectors 320 can define random number generators. Based on the noise vectors 320, the generator 316 can generate fake or synthetic data, which can be stored in the sanitized synthetic data database 227. During training, fake data and the real data can be input to the discriminator 318, from the synthetic data database 227 and the raw data database 226, respectively. The discriminator 318 can lean real data from fake data, and the outputs of the discriminator 318 can be fed back to the generator 316 so that the neural network module 236 can be fine-tuned. Thereafter, the generator 316 can generate synthetic data that more closely resembles the corresponding raw data, or defines statistical properties that more closely resemble select statistical properties of the raw data.

Thus, training phase can include gathering the original source data for subscribed variables or statistical properties of interest. Such variables or properties of interest can be configured on the DCU 106 via a configuration file or a user interface, for example. The source data can be input to the generator 316 and the discriminator 318. The discriminator 318 can use the source data as a training dataset (e.g., sampling from it) and can control the training process until predetermined accuracy levels are reached. The generator 316 can use those samples to generate seed data, in some cases, as opposed to randomized data from a normal distribution. The generator 316 can derive the distribution of the data, then use the distribution to spread random data to, so as to increase the error rate of the discriminator 318 (e.g., fooling the discriminator into thinking incorrect candidates are selected). In some cases, the neural network can be configured so as to be in a continuous training mode, wherein its output parameters are adjusted as incoming data arrives.

Figure 4:
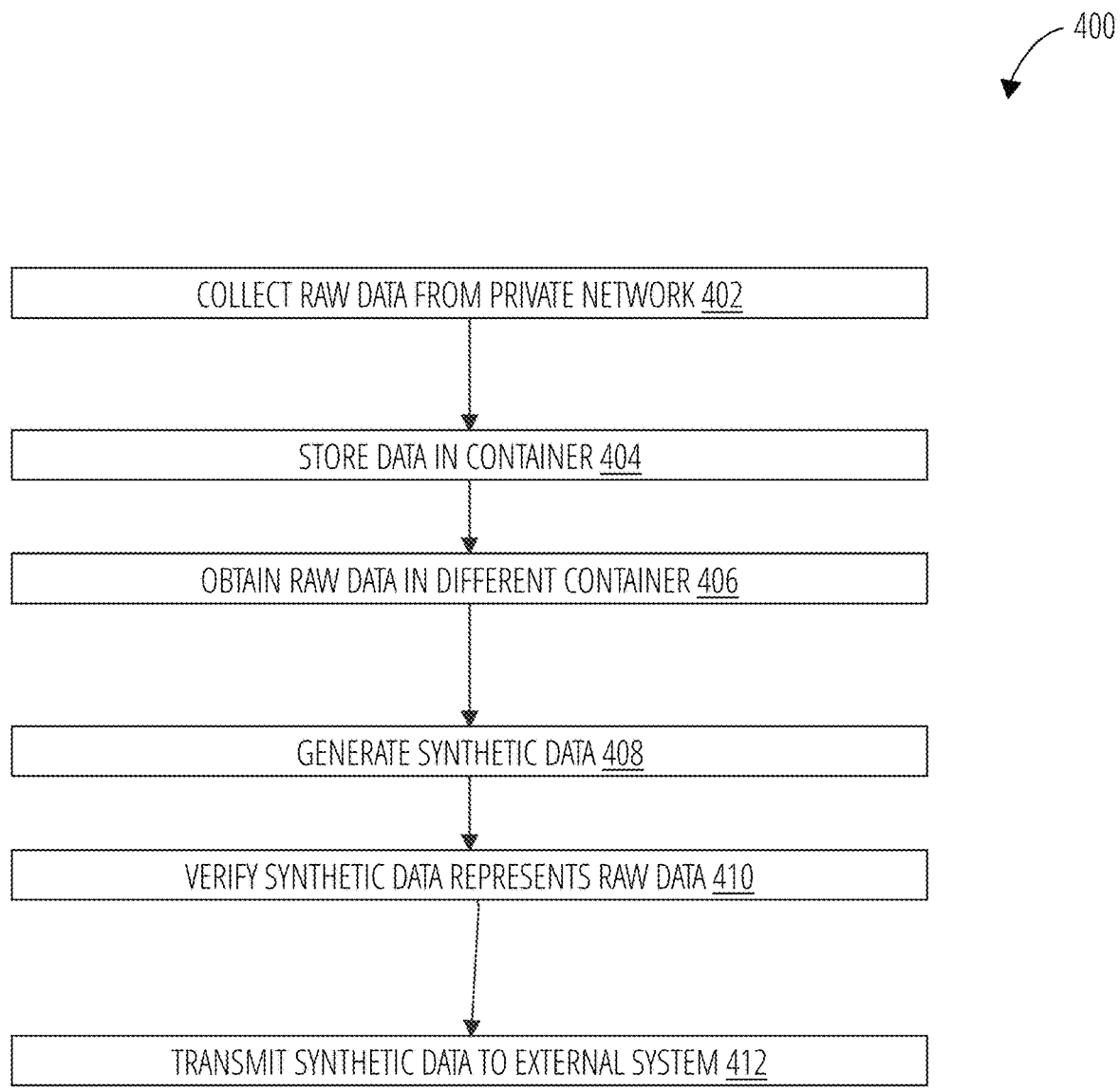
FIG. 4 is a flow diagram that can be performed by the DCU apparatus in accordance with an example embodiment.

Referring now to FIG. 4, an example operation 400 can be performed by the DCU 106 that includes the sender machine 202 and the receiver machine 204 physically isolated from the sender machine 202. The monitoring apparatus 208 can be disposed between the sender machine 202 and the receiver machine 204, and the DCU 106 can be disposed between a private network and a public network. Thus, the monitoring apparatus 208 can be disposed between the private network and the public network. At 402, the sender machine 202 can collect real or raw data from one or more devices of the private network. In some cases, the data collection application 234 application 234 listens to the unidirectional network interface 206 to collect data from the private network. At 404, the data collection application 234 can store the raw data within a container. For example, the data collection application 234 can store the raw data at the raw data database 226 that is within the first container 304. At 406, in an example, the neural network module 236 that is located in a different container as the raw data database 226 can obtain the raw data. For example, the neural network module 236 within the second container 306 can retrieve the raw data from the raw data database 226. Based on the retrieved raw data, at 408, the neural network module 236 can generate synthetic data that corresponds to the raw data. At 410, the neural network module 236 can verify that the generated synthetic data represents the raw data accurately. For example, the data distribution of the raw data can be compared to the data distribution of the synthetic data, and if the data distributions are within a predetermined tolerance of each other, the synthetic data can be verified. If the synthetic data is not verified, the data can be fed back to the generator 316 so that updated synthetic data can be generated. In an example, when the synthetic data is verified at 410, it can be transmitted to an external system, such as the IT network 102 or the central server 314. In particular, the sender machine 202 can transmit the verified synthetic data to the receiver machine 204 via the monitoring apparatus 208, and the receiver machine 204 can transmit the synthetic data externally from the DCU 106.

Without being bound by theory, it is recognized herein that, in accordance with various embodiments, if data is somehow hacked as it is being sent to the receiver machine 204 or sent from the receiver machine 204 to an external system, the hacker would access fake or synthetic data. Thus, in some cases, even if communications were intercepted, secrets related to the raw data might remain protected and private.

Figure 5:
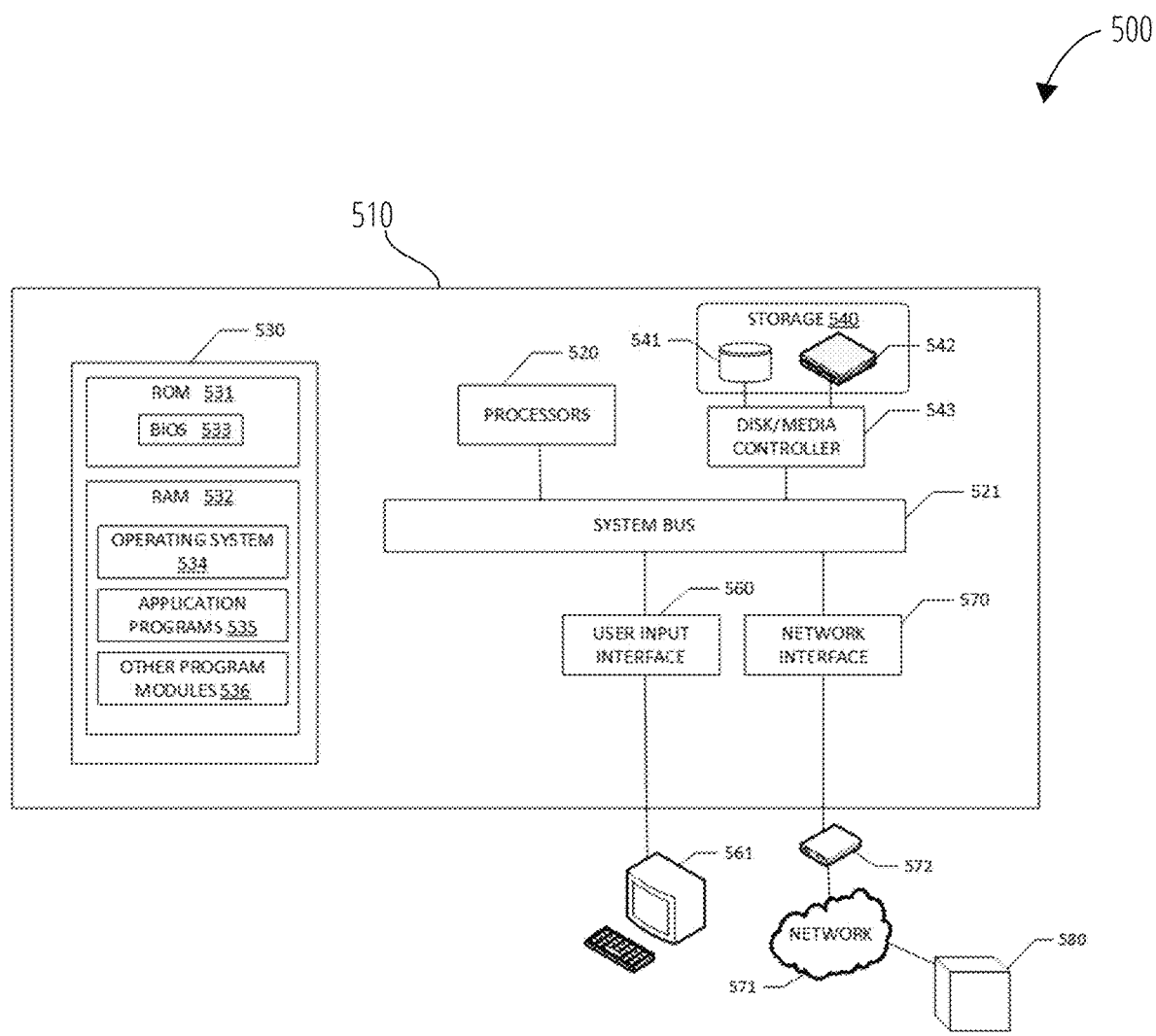
FIG. 5 illustrates a computing environment within which embodiments of the disclosure may be implemented.

FIG. 5 illustrates an example of a computing environment within which embodiments of the present disclosure may be implemented. A computing environment 500 includes a computer system 510 that may include a communication mechanism such as a system bus 521 or other communication mechanism for communicating information within the computer system 510. The computer system 510 further includes one or more processors 520 coupled with the system bus 521 for processing the information. The robot device 104 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 521 may include at least one of a system bus, a memory bus, an address bus, or a message bus, and may permit exchange of information (e.g., data (including computer-executable code), signaling, etc.) between various components of the computer system 510. The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 5, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 500 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 5 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 5 and/or additional or alternate functionality. Further, functionality may be modularized differently such that processing described as being supported collectively by the collection of program modules depicted in FIG. 5 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 5 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A data capture apparatus configured to operate as a unidirectional communication connection between a private network and a public network, the data capture apparatus comprising:
a sender machine comprising:
a unidirectional network interface coupled to one or more devices of the private network, the sender machine configured to collect raw data from the one or more devices of the private network, the raw data defining a first data distribution;
an input coupled to a wire; and
an output coupled to the wire;
a receiver machine configured to receive anonymized data from the sender machine via the unidirectional communication connection; and
a monitoring apparatus comprising the wire coupled to the output and input of the sender machine so as to define a loop, the monitoring apparatus further comprising an interceptor inductively coupled to the loop so as to define the unidirectional communication connection,
wherein the sender machine is configured to generate the anonymized data based on the first data distribution of the raw data, such that the anonymized data represents the raw data without disclosing the raw data, and the receiver machine is coupled to the interceptor and to the public network, the receiver machine configured to listen to the interceptor at one or more specific times so as to receive the anonymized data from the sender machine over the unidirectional communication connection defined by the monitoring apparatus.

2. The data capture apparatus of claim 1, wherein the receiver machine is configured to send the anonymized data to an analysis system within the public network, such that the raw data can be analyzed based on the anonymized data that represents the raw data.

3. The data capture apparatus of claim 1, wherein the sender machine is further configured to generate the anonymized data that corresponds to the raw data as the sender machine receives the respective raw data, so as to define continuous online data anonymization.

4. The data capture apparatus of claim 1, wherein the sender machine further comprises a neural network configured to generate the anonymized data based on the raw data such that the anonymized data defines synthetic data having a second data distribution that falls within a predetermined tolerance of the first data distribution.

5. The data capture apparatus of claim 4, wherein the sender machine is configured to train the neural network based on real data from the one or more devices of the private network.

6. The data capture apparatus of claim 4, wherein the sender machine comprises a first container and a data collection application within the first container, the data collection application configured to listen to the unidirectional network interface so as to collect the raw data from the one or more devices of the private network.

7. The data capture apparatus of claim 6, wherein the sender machine further comprises a second container separate from the first container, the neural network within the second container.

8. A method performed by a data capture apparatus that comprises a sender machine comprising an input and output coupled to a wire so as to define a loop, a receiver machine physically isolated from the sender machine, and a monitoring apparatus between the sender machine and the receiver machine, the monitoring apparatus comprising the wire and an interceptor coupled to the loop so as to define a unidirectional communication connection, the data capture apparatus disposed between a private network and a public network, method comprising:
the sender machine collecting raw data from one or more devices of the private network, the raw data defining a first data distribution;
based on the first data distribution of the raw data, generating anonymized data that represents the raw data without disclosing the raw data; and
the receiving machine listening to the interceptor at one or more specific times so as to receive the anonymized data from the sender machine over the unidirectional communication connection defined by the monitoring apparatus.

9. The method of claim 8, the method further comprising:
the receiver machine sending the anonymized data to an analysis system within the public network, such that the raw data can be analyzed by the analysis system, based on the anonymized data that represents the raw data, without the analysis system obtaining the raw data.

10. The method of claim 8, wherein generating anonymized data further comprises:
generating the anonymized data that corresponds to the raw data as the sender machine receives the respective raw data, so as to define continuous online data anonymization.

11. The method of claim 8, wherein the sender machine comprising a neural network, the method further comprising:
generating, by the neural network, the anonymized data based on the raw data such that the anonymized data defines synthetic data having a second data distribution that falls within a predetermined tolerance of the first data distribution.

12. The method of claim 11, the method further comprising:
training the neural network based on real data from the one or more devices of the private network.

13. The method of claim 12, wherein the sender machine comprises a first container and a data collection application within the first container, the method further comprising:
listening, by the data collection application, to a unidirectional network interface of the sender machine so as to collect the raw data from the one or more devices of the private network.

14. The method further of claim 13, wherein the sender machine further comprises a database within the first container, the method further comprising:
storing, by the data collection application, the raw data in the database within the first container.

15. The method further of claim 14, wherein the sender machine further comprises a second container that is separate from the first container, the neural network within the second container, the method further comprising:
retrieving, by the neural network, the raw data from the database within the first container; and storing the synthetic data in a second database that is within the second container.

16. The method of claim 8, the method further comprising:

storing the anonymized data in a database on the receiver machine of the data capture apparatus.

17. A system comprising a central server and a plurality of data capture apparatuses, each data capture apparatus of the plurality of data capture apparatuses configured to operate as a unidirectional communication connection between the central server and a respective private network of a plurality of private networks, each data capture apparatus comprising:

a sender machine comprising a unidirectional network interface coupled to one or more devices of the respective private network, and an input and output coupled to a wire so as to define a loop, the sender machine configured to:

collect raw data from the one or more devices of the respective private network, and based on the raw data, generate synthetic data that represents the raw data without disclosing the raw data;

a receiver machine configured to:

receive the synthetic data from the sender machine via the unidirectional communication connection, and send the synthetic data to the central server, such that the raw data from the plurality of private networks can be analyzed, based on the synthetic data that represents the raw data, without the central server obtaining the raw data; and a monitoring apparatus comprising:

the wire coupled to the output and input of the sender machine so as to define the loop; and an interceptor inductively coupled to the loop so as to define the unidirectional communication connection, wherein the receiver machine is coupled to the interceptor and to the central server, the receiver machine configured to listen to the interceptor at one or more specific times so as to receive the anonymized data from the sender machine over the unidirectional communication connection defined by the monitoring apparatus.

* * * * *